United States Patent
King et al.

(10) Patent No.: US 12,212,713 B2
(45) Date of Patent: Jan. 28, 2025

(54) METHOD AND SYSTEM FOR MANAGING AN INCIDENT CALL

(71) Applicant: MOTOROLA SOLUTIONS, INC., Chicago, IL (US)

(72) Inventors: Melanie King, Wesley Chapel, FL (US); Alisa Jamnongpipatkul, Inverness, IL (US); Mark Antilla, Davie, FL (US); Pranay Muchandi, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 205 days.

(21) Appl. No.: 17/816,595

(22) Filed: Aug. 1, 2022

(65) Prior Publication Data
US 2024/0040041 A1 Feb. 1, 2024

(51) Int. Cl.
*H04M 3/51* (2006.01)
*G06F 3/16* (2006.01)

(52) U.S. Cl.
CPC .......... *H04M 3/5116* (2013.01); *G06F 3/167* (2013.01); *H04M 2201/40* (2013.01); *H04M 2201/42* (2013.01); *H04M 2203/306* (2013.01)

(58) Field of Classification Search
CPC .......... H04M 3/5116; H04M 2201/40; H04M 2201/42; H04M 2203/306; H04M 3/5175; G06F 3/167
See application file for complete search history.

(56) References Cited

U.S. PATENT DOCUMENTS

| | | | |
|---|---|---|---|
| 7,328,453 B2 | 2/2008 | Merkle, Jr. et al. | |
| 7,733,224 B2 * | 6/2010 | Tran | G16H 80/00 340/8.1 |
| 7,930,745 B2 | 4/2011 | Fang | |
| 9,516,485 B1 * | 12/2016 | Bowers | H04M 19/04 |
| 9,566,411 B1 * | 2/2017 | Sherpa | G06F 16/436 |
| 10,123,197 B2 * | 11/2018 | Sennett | H04W 40/22 |
| 10,547,738 B1 | 1/2020 | Anders et al. | |
| 10,878,683 B2 * | 12/2020 | Howard | G08B 25/016 |
| 11,810,675 B2 * | 11/2023 | Heimerl | A61B 5/08 |

(Continued)

FOREIGN PATENT DOCUMENTS

| | | |
|---|---|---|
| CN | 205195800 U | 4/2016 |
| WO | 2020071930 A1 | 4/2020 |

OTHER PUBLICATIONS

The International Search Report and the Written Opinion, corresponding patent application No. PCT/US2023/027764 filed: Jul. 14, 2023, mailed: Oct. 12, 2023, all pages.

*Primary Examiner* — Lisa Hashem
(74) *Attorney, Agent, or Firm* — Barbara R. Doutre; Miles I. Polley

(57) ABSTRACT

A system and method are provided for managing an incident call between a public safety responder and a target. Once an incident call is established, the system and method perform audio analytics on the call to determine a trusted side of the call and a target side of the call. The method and system determine, based on the audio analytics of the call, that the trusted side of the call should be modified to create a suitable call environment perception for the target side of the call. Modifications are then made at the trusted side of the call by injecting background audio to create the suitable call environment to be heard at the target side of the call.

29 Claims, 4 Drawing Sheets

(56) References Cited

U.S. PATENT DOCUMENTS

| | | | |
|---|---|---|---|
| 2005/0064826 | A1 | 3/2005 | Bennetts et al. |
| 2010/0263058 | A1 | 10/2010 | Reta et al. |
| 2014/0162583 | A1* | 6/2014 | Daly .................... H04M 3/5116 |
| | | | 455/404.1 |
| 2016/0021151 | A1 | 1/2016 | Bain et al. |
| 2019/0066710 | A1* | 2/2019 | Bryan ................. G10L 21/0364 |
| 2019/0342111 | A1 | 11/2019 | Rose et al. |
| 2021/0400142 | A1 | 12/2021 | Jorasch et al. |
| 2023/0388416 | A1* | 11/2023 | Srivastava ........... G08B 27/001 |
| 2024/0029895 | A1* | 1/2024 | Heimerl ................. G16H 50/30 |
| 2024/0108286 | A1* | 4/2024 | Tran ....................... G06Q 50/22 |
| 2024/0290337 | A1* | 8/2024 | Reng ....................... G10L 25/18 |

* cited by examiner

METHOD AND SYSTEM FOR MANAGING AN INCIDENT CALL

FIELD OF THE INVENTION

This application pertains to managing an incident call, and more particularly to a communication system for injecting background audio into a call environment, the background audio being selected based on suitability to different types of incident calls.

BACKGROUND OF THE INVENTION

Public safety personnel are often involved in phone calls that take place between a call taker (such as a dispatcher, officer, negotiator, medic or the like) and a person of interest during an on-going incident. Such calls may include, for example, hostage negotiations, terrorist threats, suicide threats and/or any other call where the emotional state of the person of interest is critical to the stabilization and safety of those involved in the on-going incident. The audio environment at the public safety side of the call may be overheard by the person of interest causing stress or aggravation to that person, which may potentially intensify the public safety incident. The ability to help steer the emotional state of the person of interest is important to bringing an on-going incident to a positive conclusion.

Accordingly, it would be beneficial to improve the incident call experience between public safety personnel and a person of interest during a public safety incident call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
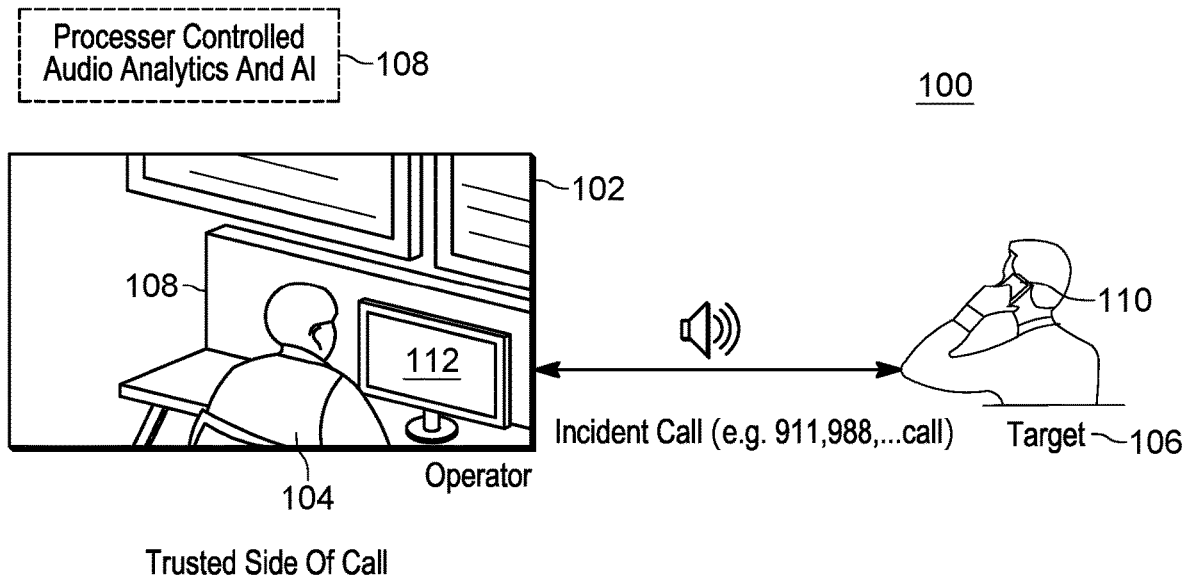
FIG. 1 a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a system and method for managing an incident call between a public safety responder and a target. Once an incident call is established, the method and system provide for performing audio analytics on the call to determine a trusted side of the call and a target side of the call. The method and system determine, based on the audio analytics of the call, that the trusted side of the call should be modified to create a suitable call environment perception for the target side of the call. The system and method then modify the trusted side of the call by injecting background audio to create the suitable call environment to be heard at the target side of the call. The audio analytics may include environmental contextual awareness analysis of both the trusted side of the call and the target side of the call which further facilitates the selection of the background audio content to be injected into the trusted side of the call to be heard at the target side of the call. The system and method provide for injection of pre-recorded audio clips (which may be generic and/or focused). In some embodiments, the system and method may further dynamically adjust the background audio in real time based on the current and/or changes in emotional state and/or focus of the target, as determined by the audio analytics. The system and method advantageously facilitate bringing a public safety incident call to a positive conclusion. The injected background audio is aimed at bringing about a desired behavior of the target in an effort to minimize threat(s) to self or others.

Figure 2:
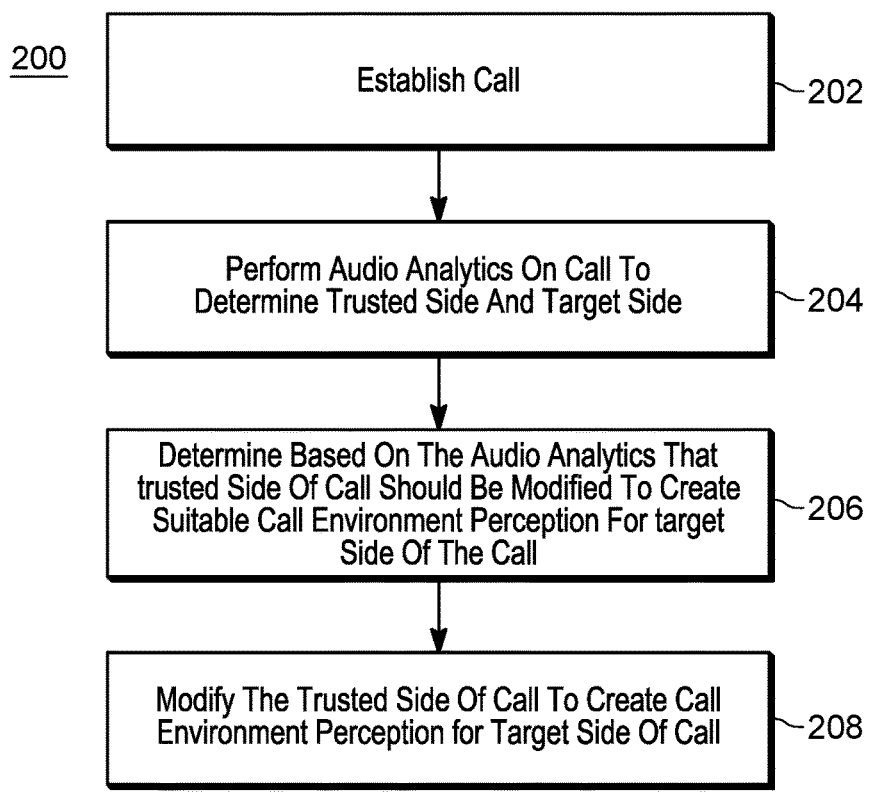
FIG. 2 is flowchart of a method of operating a communication system formed and operating in accordance with some embodiments.

FIG. 1 illustrates a block diagram of a communication system 100 formed and operating in accordance with some embodiments. FIG. 2 is flowchart of a method for managing an incident call using the communication system of FIG. 1 in accordance with some embodiments. FIGS. 1 and 2 illustrate a communication system and method for managing an incident call between a public safety responder/operator 104 and a target 106. The communication system 100 includes a public safety workstation 102, such as a dispatch center, call center, hotline, or the like, managed by the public safety responder 104 (also referred to as an operator). The public safety workstation 102 further includes, or interoperates with, one or more computers, servers, and/or base stations, such as those used in public safety networks. The public safety workstation 102 includes a processor 108 providing processor controlled audio analytics and artificial intelligence capabilities. The public safety workstation 102 may be located on premise (embodied as a stationary public safety agency communication device as shown), or may be embodied as a mobile public safety agency communication device (such as a handheld public safety radio communication device or a vehicular public safety radio communication device), and/or may be further interoperable as part of a remote/cloud based network. The operator of public safety workstation 102 may be, for example, a dispatch operator, 911 operator, 988 operator, law enforcement person, medic or other public safety personnel. The target 106 may be a person of interest, suspect, or other person who, for the purposes of this application, may be a potential threat to self or others.

Referring to FIGS. 1 and 2, a call is established at 202, such as over a 911 call, 988 call, or other incident call between the public safety workstation 102 managed by the operator 104 and a remote communication device 110 under control of the target 106. The public safety workstation 102 includes the processor 108 configured to perform audio analytics on the call at 204 to determine a trusted side of the call and a target side of the call. The processor 108 may reside locally within or remotely from, the public safety workstation 102 and further interoperates with a database, memory or the like for storing a plurality of different artificial audio environment clips. The public safety responder/operator 104 may manually trigger the system to perform audio analytics on the call, or the audio analytics may be triggered automatically in response to predetermined keywords from the target, such a threats to oneself or others, as determined by the audio analytics. If the system does automatic detection, a confirmation query can be displayed on a display 112 of the public safety workstation 102 indicating to the operator to the type of threat associated with the incident call an option to perform further analytics on the call. For example, the display might display a "potential suicide threat call", "potential hostage threat call", "potential terrorist threat call", or the like, on display 112 with an option to perform further analytics on the call.

In response to either manual or automated trigger of the analytics, the method further continues to determine at 206, based on additional audio analytics of the call, that the trusted side of the call should be modified to create a suitable call environment for the target side of the call. The trusted side of the call is then modified at 208 to create a call environment perception for the target side of the call. The call environment perception may be achieved by injecting background audio to create the suitable call environment perception for the target side of the call. As will be described in conjunction with the remaining figures, the injected background audio may initially be injected from a pre-stored audio clip for the particular type of incident call, and then customized in real time throughout the call based on changes (or lack of changes) of the target's emotional state and focus, the target's emotional state being determined based on further audio analytics and threshold comparisons taking place throughout the call.

While the target 106 is shown in FIG. 1 as communicating using a portable communication device, such as a cell phone, smart phone, tablet or the like having a microphone and speaker, the embodiments may further extend to include communication PA systems, such as a school PA system, where customized audio aimed at redirecting behaviors of the target is injected and played out at one or more speakers throughout and/or external to a school building, school campus, or other large venue.

Figure 3:
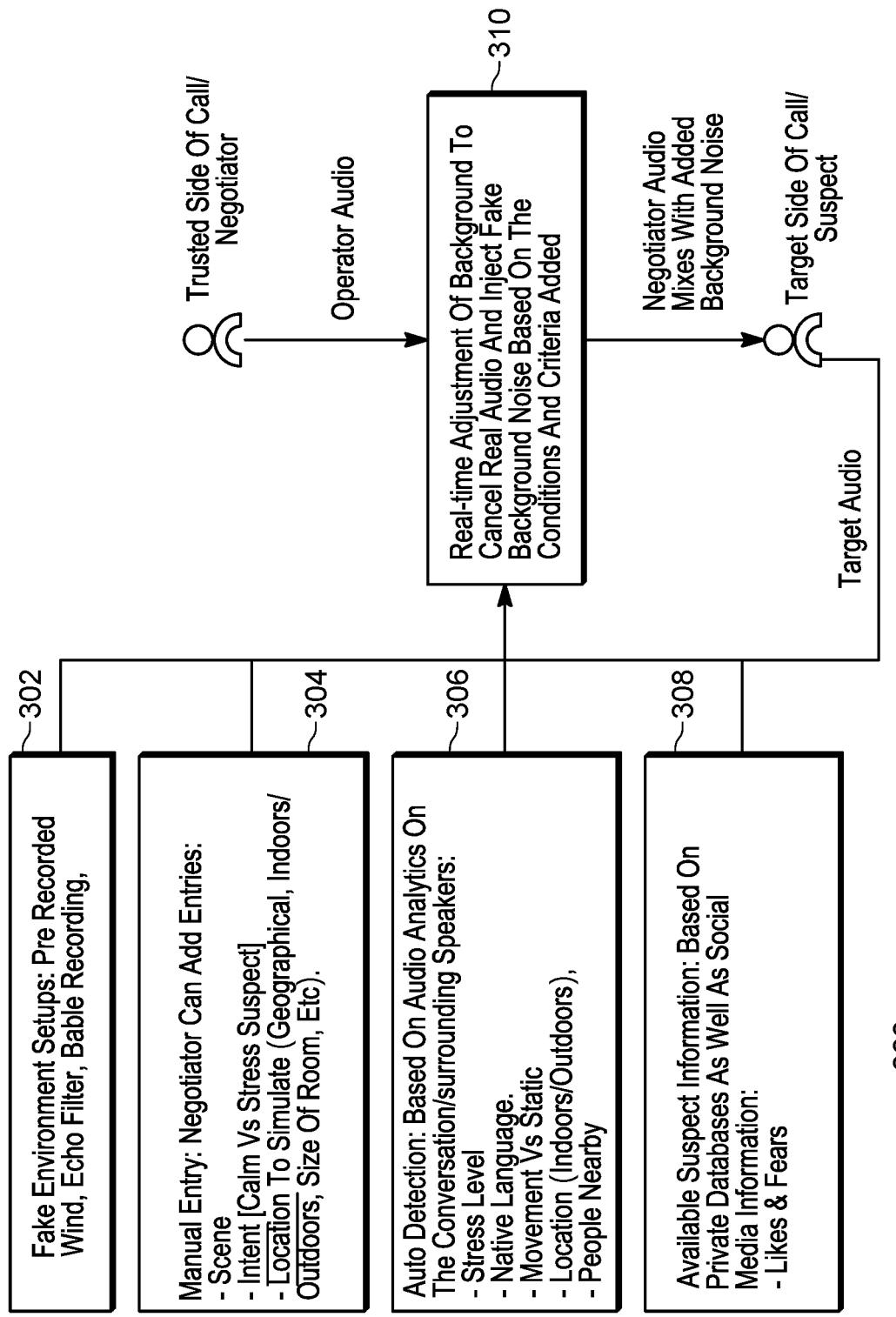
FIG. 3 shows an example of analytics taking place during operation of a communication system formed and operating in accordance with some embodiments.

FIG. 3 shows an example of various stages for the processor controlled audio analytics and artificial intelligence (AI) processes taking place during operation of the communication system of FIG. 1 in accordance with some embodiments. In this example, an incident call is taking place between a target (suspect or other person of interest) and an operator (negotiator, dispatch person, or other public safety person) on the trusted side of the call. The call is taking place through the public safety workstation 102, such as a dispatch center, on-scene public safety deployment communications, hot-line center, or other trusted agency, as previously described.

At stage 302, pre-recorded artificial (also referred to as fake) audio environment clips have been pre-recorded and stored within a database accessible by the processor 108 of FIG. 1. The sample audio clips may include, for example, generic background audio as well as more focused background audio. These pre-recorded audio clips are selectively available for different types of incident calls. The injected audio may be enabled either manually at stage 304 by the operator or automatically at stage 306, the automatic enablement being based on the initial audio analytics taking at the beginning of the call. The audio analytics may continue to be processed throughout the call to determine target stress levels beyond a threshold, accents, cadence, movement vs. static, location (indoor/outdoor) and the presence of other nearby people to further refine the automated selection and further trigger real time adjustment of the background audio at stage 310. Additional impulse responses (IR) may be stored within database of the system which may be mixed with the selected background audio clip(s) to generate customized background audio in real time, where the customized background audio creates a more personalized audio aimed at bringing about a desired behavior of the target.

Figure 5:
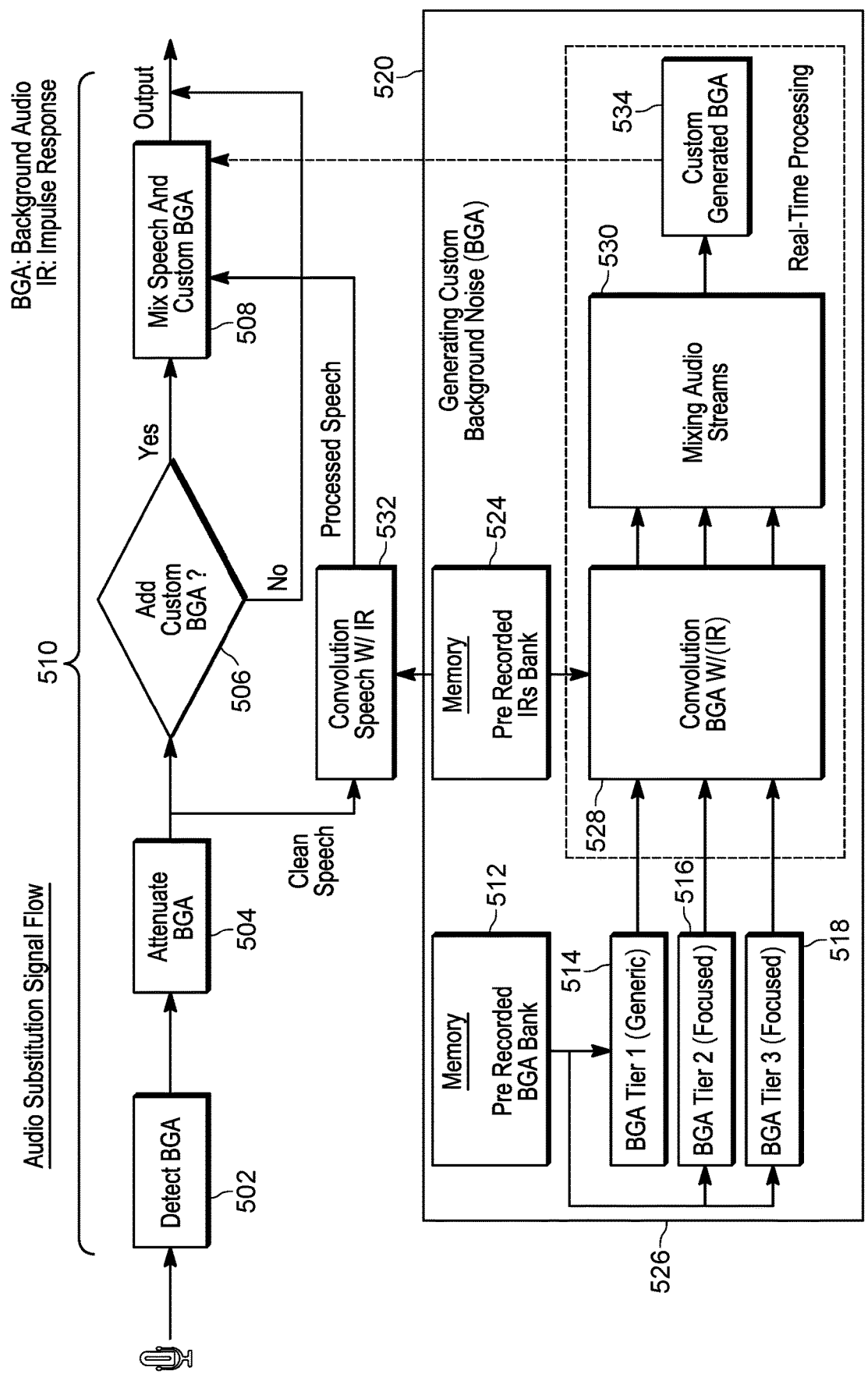
FIG. 5 is a system block diagram for audio processing occurring at a public safety workstation of a communication system formed and operating in accordance with some embodiments.

As will be further described in conjunction with FIG. 5, a plurality of background audio clips have been created and pre-stored into a memory of the public safety workstation 102 that include both generic and focused audio clips which may be enhanced with the different pre-stored impulse responses (IRs) stored in a pre-recorded impulse memory bank of the agency system or agency device. The processor controlled analytics, may selectively enable impulse (IR) responses for mixing with one or more of the selectable background audio clips to provide a real time customized mixed audio stream for injection into the background of the trusted side of the call to be played out at a speaker of remote communication device 110 and heard at the target side of the call.

At stage 304, the operator, based on the type of call taking place with the target may selectively inject one or more different audio clips to be heard in the background at the negotiator's side of the call. Under manual selection, the processor is still configured to facilitate the selection process based on the detected incident type. The user selectable injected audio may further provide recommendations to achieve behavioral goals of the target side of the call. (e.g. divert the target, confuse the target, stress the target). Audio clips including simulated location types may be recommended such as indoor audio or outdoor audio sounds. If further analytics are desired by the operator, or if the system is set for automated audio analytics, then the system goes to stage 306.

At stage 306, initial automatic selection of an audio clip from the prestored clips may be based on the audio analytics performed on the conversation taking place between the operator and the target as well as audio occurring in proximity to either operator and/or target. At stage 306, the audio analytics may further perform environmental contextual awareness analysis of both the trusted side of the call and the target side of the call. For example, audio analytics can determine a target's stress level, native language, movement based on voice/breathing cadence, as well as environmental context factors such as target's location (indoors/outdoors), voices of nearby people, noise of machinery, and the like. The audio analytics may determine, for example, that the target is highly stressed, agitated, and moving quickly within a building with people nearby.

At stage 308, the processing is further configured to determine, based on key words input by the target or the operator, such as a target's name/identity (if known), to retrieve available target information from a variety of public and/or private databases that identify a target's personal traits. The target personal trait information may be used to determine appropriate audio clips for mixing with selected background audio to create a more customized background audio for the target. For example, if the target utilizes social media, then various triggers for the target's state of mind, such as likes and fears, may be derived to further enhance and optimize an audio clip match. For example, if the target is known to have certain personal preferences, such as to like birds, has a favorite song or favors a particular style of music, then these types of factors can be used to help retrieve or generate an optimized audio clip aimed at calming the target. Manual selection stage 304 and/or automated selection, at stage 306, may be enhanced by an individual target's personal preferences if such preferences are known and accessible.

The audio analytics taking place at stages 302, 304, 306, 308 may all be enhanced with real time adjustments throughout the duration of the call, at stage 310, as changes in behavior and/or changes at the incident occur. The manual selection and auto detection and selection (with or without the personal preferences information) are provided to the processor to enable read time adjustments of background audio at stage 310. The adjustment of background audio may include filtering/canceling real background audio at the trusted side of the call and injecting the customized background audio in response to the analytics of stages 304, 306, 308.

Real time adjustments at stage 310 may include modifying the trusted side of the call by injecting audio into the trusted side of the call. The injected audio may be determined based on: vocal content including keyword and speech characteristics, (such as accent, gender, age, ethnicity, vocabulary/education level, to name a few) of the target side of the call; the environmental contextual awareness analysis of the target side of the call; and the environmental contextual awareness of the trusted side of the call. The injection of audio into the trusted side of the call further include filtering out current background audio at the trusted side of the call; and injecting the one or more pre-recorded audio clips into the background of the trusted side of the call; and dynamically updating the background of the trusted side of the call based on target response.

In accordance with some embodiments, the injected pre-recorded audio or dynamically updated audio may include one or more of injected voice; injected noise, and/or injected sounds wherein the injected voice and/or noise and/or sounds create the call environment perception aimed at the target side of the call. The real time adjustment may further include modifying the trusted side of the call to create the call environment perception for the target side based on incident type. (e.g. words spoken representative of a kidnapping/ransom demands). The injected audio may further change the perception of location of the trusted side of the call. The injected audio may change the perception of events taking place at the trusted side of the call.

One or more of stages 306, 308 may be performed automatically throughout the call duration. The audio modifications to the call are updatable as the call progresses. (e.g. as the target responds and/or changes moods, the injected audio can change/reward in response thereto). The injected background audio can be retrieved from pre-stored background audio clips which can be further enhanced based on pre-stored impulse responses aimed at a more personalized target experience.

Figure 4:
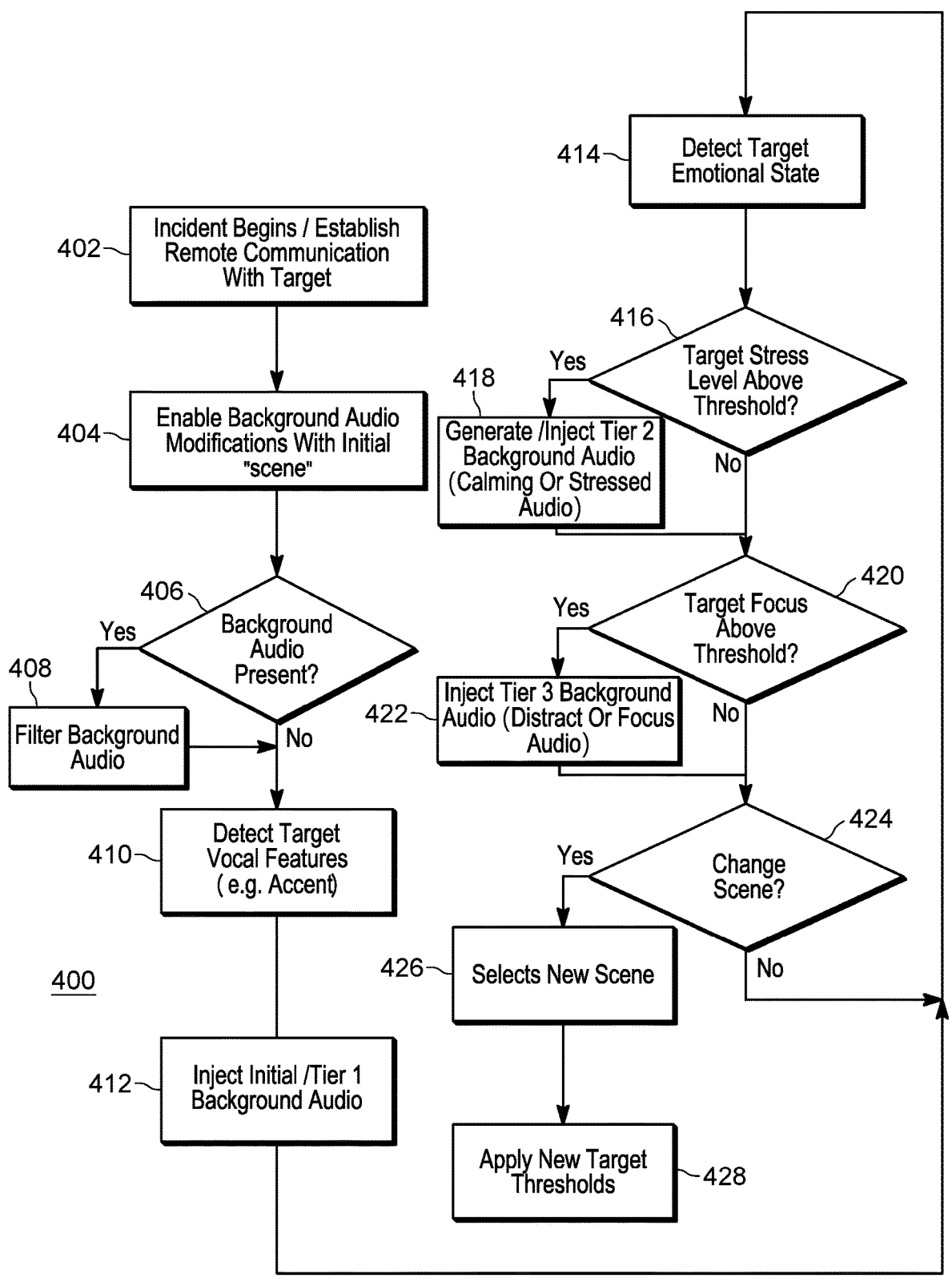
FIG. 4 is flowchart of a method of managing an incident call in accordance with some embodiments.

FIG. 4 is a method 400 providing a more detailed example for managing an incident call between a public safety responder and a target using the communication system 100 of FIG. 1 in accordance with some embodiments. At 402, communications are established including processor controlled audio analytics being performed on the incident call to determine a trusted side of the call (operator) and a target side of the call. The trusted side of the call may be taking place at a public safety agency, such as a command center station, dispatch center, on-scene deployment, or other trusted agency.

At 404, a background audio modifications feature is enabled for the incident type (suicide treat, hostage threat, terrorist threat to name a few). The modifications feature may be enabled at 404 based on determining that the trusted side of the call should be modified to create a suitable call environment perception for the target side of the call. The enablement of the modification feature may be automatic based audio analytics performed to determine the call type, such a suicide threat, terrorist threat, hostage threat, to name a few Alternatively, the background audio modification feature may be manually enabled, on the operator side, based on the current incident type. For example a user selectable feature may be provided at the dispatch station which displays recommendations on a monitor to achieve predetermined behavioral goals aimed at the target side of the call for a particular incident, such as diverting the target, confusing the target, stressing the target. The display may provide user selectable options for managing customization of the background audio.

Once the background modification feature has been enabled at 404, the method moves to 406 where a determination is made as to the presence or absence of background audio at the operator trusted caller side. For example, the audio analytics may further perform environmental contextual awareness analysis of both the trusted side of the call and the target side of the call to determine if the trusted side of the call has background noise which is suitable for the current call. For example, if the background audio at the trusted side of the call is a noisy dispatch station or of on-scene background audio at the incident itself with sirens wailing and horns blowing, this type of background audio may inhibit the operator's ability to reason with and stabilize with the target. If background audio is present at 406 at the operator side, and such background noise has been deemed unsuitable for the current call environment, then the background audio is filtered out at 408.

If the background audio has been filtered or no such background audio has been detected, the method moves to detect target vocal features at the target side of the call at 410. Examples of vocal features associated with the target may include, but are not limited to key words spoken by the target, accent, slurred speech, vocabulary/education level, ethnicity, age, and gender of the target.

A first tier of generic background audio is injected at 412. This first tier of background audio may be based initially on the incident type alone and then further modified as the call progresses based on the vocal features of the target. For example, the first tier background audio may be automatically injected based on an incident of suicide threat and then modified based on the vocal features being indicative of the target being a young female with an identified regional accent. A prestored audio clip may be automatically selected from a plurality of prestored audio clips, based on the incident type, and then modified via addition or subtraction of background audio based on the vocal features. The method is aimed at generating and injecting background audio throughout the call which will facilitate stabilizing the target.

The method then moves to detect the emotional state of the target at 414, where the processor controlled artificial intelligence (AI) of the call system performs audio analytics to determine the target's emotional state. For example, audio analytics may further detect shouting, whispering, crying and or other emotion triggers which imply that the target is behaving in an aggressive, frightened, and/or sad manner. Moving to 416, the method determines whether the target's stress level has breached a predetermined stress threshold associated with the incident type. For example, the processor controlled AI can perform analytics to determine that the target is shouting above a predetermined shout threshold (predetermined shout volume level may equated to anger), that the target is whispering is below a predetermined whisper threshold (predetermined whisper level may be equated to emotional state of fear), or that the crying is above a predetermined crying threshold (predetermined crying threshold may be equated to emotional state of sadness). The emotional thresholds may also be based on one or more combination of shouting only, shouting and crying, crying only, or the target may be whispering and crying. If one or more particular thresholds are breached at 416, then the AI generates and the processor controlled system injects a second tier of background audio to counter the one or more detected stressed states at 418.

In accordance with some embodiments, the combination of detected vocal features (410) and emotional state (414) of the target provide a basis for generating and injecting the second tier of background audio at the operator side of the call to be played out of a speaker of the target device and heard at the target side of the call. This second tier injection is aimed at further stabilizing the target's threatening behavior to self or others. The injected audio may include voice and/or noise to create the call environment perception aimed at the target side of the call.

The second tier background audio injected at 418 can be layered (added) onto the initial background audio and/or further dynamically adjust the background audio based on the current and changing emotional state of the target. For example, predetermined first tier background audio can be initially injected at the operator side of the call in response to the incident type, such as a suicide threat, and then second tier background audio can be added to the first tier in response to the detected stress level, such as additional calming audio. For example, a soothing church sound environment (tier 1) may be augmented with church bells and organ music (tier 2). The outdoor audio sounds (tier 1) may be added to, subtracted from and/or adjusted (tier 2).

At 420, the method proceeds to check whether the target's focus has sufficiently changed. The determination of a target's focus can be based on changes in a target's key words and current emotional state (changes in the shouting, crying, and/or whispering levels), and/or changes in target actions (such as actions communicated by other first responders to the operator). For example, determining if the target is continuing to threaten suicide in a suicide threat call.

If the target's focus is still posing a potential threat (to self or others), then the processor driven AI moves to 422 to generate and inject a third tier of background audio aimed at distracting and/or re-focusing the target. This third tier injected background audio may add to or modify the previously injected second tier background audio in real time. Again, the processor controlled audio analytics can be used to select an appropriate third tier background audio based on previously collected and stored audio clips. For example, the third tier audio may include voices and/or commands, or distracting the target with the injected sound of crying kittens or puppies (aimed at diverting the target's attention).

The method continues at 424 where operator controlled input is used to determine whether the incident scene has sufficiently changed (i.e. the scene is now under control, threat to self or others has been minimized). For example, a confirmation from other public safety personnel at the scene may communicate that the target has been stabilized. If not, then the method returns to 414 to detect the current emotional state of the target and adjust the background audio until the target's focus has sufficiently changed for the incident scene.

The audio analytics may be performed automatically throughout the call duration, and the background audio is updatable as the call progresses. For example, as the target responds and/or changes moods, the injected audio can be adjusted. The injected audio can further be manipulated to reassure the target as the target's behavior improves. For example, as the target calms down, audio aimed at indicating approval to the target can be injected into the trusted side of the call.

When a determination is made at 424 that the incident scene has sufficiently changed (e.g. scene is under control, target stabilized), the operator side of the call can select a new incident scene at 426, and new target thresholds can be applied, at 428 for the new incident type and target.

Accordingly, the method 400 has been provided for managing an incident call between a public safety responder and a target which can be summarized by: establishing a call and performing audio analytics on the call to determine a trusted side of the call and a target side of the call (402); determining, based on the audio analytics of the call, that the trusted side of the call should be modified to create a suitable call environment perception for the target side of the call (404); and enabling a background audio modification feature (404); and modifying the trusted side of the call, by enabling a background audio modification feature, to create the call environment perception for the target side of the call (406).

The modifying of the trusted side of the call includes injecting audio into the trusted side of the call, the injected audio being determined may be based on: vocal content (keyword and speech characteristics) of the target side of the call; the environmental contextual awareness analysis of the target side of the call; and the environmental contextual awareness of the trusted side of the call. The background audio injected into the trusted side of the call may further be determined based on information retrieved from public and/or private databases associated with the target (if the target identity is known). The injecting of audio into the trusted side of the call may further include filtering out background audio (408) at the trusted side of the call, and injecting pre-recorded audio clips into the background audio of the trusted side of the call. The audio clips being injected into the background of the trusted side of the call may begin with pre-recorded audio clips for various incident types and detected vocal features (410) of the target. The audio clips may be further dynamically generated and adjusted (418, 422) in real time in response to additional detected personalized target information (and changes thereto occurring throughout the call), such as changes in target vocal features (410), target emotional state (414) target stress levels (416), and target focus (420). The audio clips may be further dynamically generated and adjusted based on public/private information associated with the target (if the identity of the target known). The method thus beneficially enables customized background audio generated at the trusted side of the call to be heard by the target. The injected prerecorded audio or dynamically generated real time audio may include one or more of: injected voice; injected noise, and/or other injected sounds. The injected voice, noise and/or other sounds create the call environment perception aimed at the target side of the call. The injected background audio is aimed at obtaining a desired reaction from the target, for example, calming the target, stressing the target, distracting the target, or other reactions that aid in minimizing a threat to self or others.

FIG. 5 is a system block diagram 500 for audio processing occurring at the public safety workstation 102 of communication system 100 formed and operating in accordance with some embodiments. The system 500 represents the processor controlled operations taking place for example, within the public safety workstation 102 FIG. 1 including the audio analytics and artificial intelligence (AI) processing taking place at the trusted side of the call. The system 500 includes an audio substitution signal flow 510 through 502-508 which receives the background audio clips generated through background audio processing 520 for injection back into the background of the trusted side of the call to be played out of the target device speaker and heard by the target at the target side of the call.

Background audio at the trusted side of the call is detected at 502 of the signal flow. Based on the type of incoming call from a target, and the current background audio at the operator side, the system may determine that the background audio should be attenuated (filtered) at 504 and replaced or mixed with a customized background audio. It is possible that attenuation of the background noise may be sufficient for the call to proceed (e.g. removing noisy dispatch background noise may be sufficient for some calls), without injecting customized background audio. If the attenuated background is not sufficient, then the selection and injection of background audio clips can be processed through BGA processing 520.

For incident calls where the audio analytics have indicated that the target's behavior has not sufficiently changed over a predetermined period of time (i.e. target still appears to be a threat to self or to others), then the system may further trigger customized background audio at 506, which will be a mix of background audio added to the operator speech at 508. The background audio is processed through custom BGA generation 520.

Custom background audio generation 520 automatically retrieves one or more of initial prestored background audio clips 514, 516, 518 from a pre-recorded BGA memory bank 512 for the current incident type and injects it as background audio to be mixed with the operator speech at 508.

The further audio analytics of the target's vocal features and emotional state (as described in FIG. 4) allow for a more customized background audio to be generated using pre-recorded background audio stored in a BGA memory bank 512 and mixed with pre-recorded impulse responses (IR) stored in an IR memory bank 524.

For the purposes of this application, background audio clips may include voice, noise, and/or sounds which are pre-recorded and selected based on the personal traits, as detected by the audio analytics, of the target. Background audio clips may mimic a particular location (such as sounds of a crowded room). The stored BGA clips may include, but are not limited to, different locations and surroundings and may include different types of sounds, (e.g. music, noise). The background audio clips may further be selected based on the personalization factors of the target (as detected by the audio analytics) such as age, gender, and nationality of the target, to name a few. The background audio clip may be selected to be familiar to a target.

For the purposes of this application, pre-stored impulse responses (IRs) are defined as transient audio clips that provide spatial information to process the selected background audio clips. The IRs are selected to enhance the background audio clips. For example, a clap or gunshot may be stored in the IR memory bank 524. This can be any short, transient sound that can be mixed with BGA to make it seem like a different scene or location. Using the clap example, reverb would make it seem like the trusted side of the call is taking place in a large room. Hence, the impulse responses provide audio manipulation to do enhance the audio.

A processor controlled convolution algorithm modifies at 528 the background audio clip with one or more selected IRs, wherein the IR is selected from the pre-recorded IRs stored in memory 524. The retrieved IR can be convolved with the selected background audio clip for a customized audio more personalized to the target. The IR allows the adding of effects (e.g. reverb, echo, and the like) to make it more believable that the operator is in the same location as the background audio. For example, to mimic a large room, a BGA audio clips of crowded room noise can be played with additional IR of a clap with reverb to make it sound like the large room is echoing. Then, as the operator speaks, the same reverb is added so it sounds like the operator is located in that crowd of the big room.

Hence, the background audio clips 514, 516, 518 can be further configured real time to generate customized background audio at 534 with the additional of IRs to be mixed with the operator speech and played out at 508 at the operator side. The signal processing is configured to elicit certain desired behavior(s) at the target side. For example, the background audio may be aimed at calming the target with a customized background audio which is personalized to the target (familiar accent, location noise, music, to name a few) to facilitate minimizing the target's threat to self or others.

While the various embodiments have been described in terms of a single target, it is to be appreciated that the system and method may be applied to multiple targets participating in a call. For example, more than one target may be speaking with a public safety operator of the trusted side of the call. A determination can be made, based on the audio analytics performed on the call, that the trusted side of the call should be modified to create a suitable call environment perception for all the targets of the target side of the call. The trusted side of the call is then modified by injecting background audio to create the suitable call environment perception for all or some of the targets participating in the call.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing an incident call, comprising:
    establishing a call between a public safety responder and a target, the call being established over a public safety workstation operated by the public safety responder and a communication device of the target;
    performing audio analytics on the call, via a processor of the public safety workstation, to determine a trusted side of the call and a target side of the call;
    determining, based on the audio analytics of the call, that the trusted side of the call should be modified to create a suitable call environment perception for the target side of the call;
    modifying, via the processor of the public safety workstation, the trusted side of the call by injecting background audio to create the suitable call environment perception for the target side of the call; and
    further dynamically modifying, via the processor of the public safety workstation, the background audio of the trusted side of the call in response to changes in audio analytics determinations from the target side of the call.

2. The method of claim 1, wherein the audio analytics further performs environmental contextual awareness analysis of both the trusted side of the call and the target side of the call.

3. The method of claim 2, wherein injecting background audio into the trusted side of the call is based on:
    content of the target side of the call;
    the environmental contextual awareness analysis of the target side of the call; and
    the environmental contextual awareness of the trusted side of the call.

4. The method of claim 3, wherein injecting audio into the trusted side of the call further comprises:
    filtering out current background audio at the trusted side of the call; and
    injecting one or more of:
    pre-recorded audio into the background of the trusted side of the call; and
    dynamically updating the background audio of the trusted side of the call based on target response.

5. The method of claim 1, wherein the injected background audio comprises one or more of:
    injected voice;
    injected noise; and
    injected sounds.

6. The method of claim 1, wherein performing audio analytics includes one or more of:
   identifying nationality of the target side of the call;
   identifying age and gender of target side of the call;
   identifying ethnicity of the target side of the call;
   identifying stress level at the target side of the call; and
   identifying environmental contextual awareness factors of the target side of the call.

7. The method of claim 1, wherein modifying the trusted side of the call to create the call environment perception for the target side of the call is further based on incident type.

8. The method of claim 1, wherein the injected audio modifies the call environment perception for one or more of:
   trusted caller location; and
   events taking place at the trusted side of the call.

9. The method of claim 1, wherein the injected audio is user selectable.

10. The method of claim 9, wherein the user selectable injected audio is provided with recommendations to achieve behavioral goals of the target side of the call.

11. The method of claim 1, wherein the trusted side of the call is managed by an operator of a public safety agency and played out at one or more of:
    a speaker of a communication device of the target; and
    a speaker of a PA system.

12. The method of claim 1, wherein the audio analytics are performed automatically throughout the call, and then modified as the call progresses.

13. The method of claim 1, wherein the call being established originates from either of the public safety workstation to the communication device of the target; or
    the communication device of the target to the public safety workstation.

14. A communication system comprising:
    a public safety workstation for managing an incident call between a public safety responder and a target, the public safety workstation having a processor configured to:
       establish a call;
       perform audio analytics on the call to determine a trusted side of the call and a target side of the call;
       determine, based on audio analytics of the call, that the trusted side of the call should be modified to create a suitable call environment perception for the target side of the call;
       modify the trusted side of the call by injecting the background audio that creates the suitable call environment perception for the target side of the call; and
       further dynamically modify the background audio of the trusted side of the call in response to changes in audio analytics determinations from the target side of the call.

15. The communication system of claim 14, wherein the audio analytics determine changes in stress levels and focus at the target side of the call.

16. The communication system of claim 14, wherein the background audio is selected from a plurality of background audio clips stored in a memory of the communication system.

17. The communication system of claim 16, wherein the background audio is selected from the plurality of background audio clips based on the audio analytics of the call.

18. The communication system of claim 14, wherein the background audio is customized by selecting a pre-stored background audio recording from a plurality of stored background audio recordings, which is then mixed with an impulse response selected from a plurality of stored impulse responses.

19. The communication system of claim 18, wherein the pre-stored background audio recording is selected based on detected vocal features determined by audio analytics of the call.

20. The communication system of claim 14, wherein the public safety workstation further comprises a display providing user selectable options for managing customization of the background audio.

21. The communication system of claim 14, wherein the trusted side of the call is modified based on audio analytics indicative of the target being a threat to self or others.

22. The communication system of claim 14, wherein the public safety workstation is embodied as one of: a stationary public safety agency communication device or a mobile public safety agency communication device.

23. The communication system of claim 14, wherein the background audio injected into the trusted side of the call is determined based on information retrieved from public or private databases associated with the target, when an identity of the target is known.

24. The communication system of claim 14, wherein the background audio injected into the trusted side of the call is determined and modified for additional targets participating in the call.

25. The method of claim 14, wherein the established call originates from either of the public safety workstation or a communication device of the target.

26. A method of managing an incident call, comprising:
    establishing a call between a public safety responder and a target, the call being established over a public safety workstation operated by the public safety responder and a communication device of the target;
    performing audio analytics on the call, via a processor of the public safety workstation, to determine a trusted side of the call and a target side of the call;
    determining, via the processor of the public safety workstation, based on the audio analytics of the call, that the trusted side of the call should be modified to create a suitable call environment perception for the target side of the call; and
    modifying the trusted side of the call by injecting a tiered background audio to create the suitable call environment perception for the target side of the call, wherein the tiered background audio is additively injected at the trusted side of the call by the processor of the public safety workstation in response to incident type and predetermined target thresholds associated with the incident type being breached.

27. The method of claim 26, wherein the predetermined target thresholds associated with the incident type comprise one or more target emotional states for the incident type.

28. The method of claim 26, wherein the injecting of tiered background audio at the trusted side of the call comprises:
    injecting a first tier of generic background audio based on the incident type;
    injecting an additional second tier of background audio based on a predetermined target stress threshold associated with the incident type being breached; and
    injecting an additional third tier of background audio based on a predetermined target focus threshold being breached by the target.

29. The method of claim 26, further comprising:
    applying new target thresholds for a new incident type.

* * * * *